United States Patent [19]

Matsumoto et al.

[11] Patent Number: 5,306,763
[45] Date of Patent: Apr. 26, 1994

[54] PROCESS FOR THE PREPARATION OF RUBBER-CONTAINING GRAFT COPOLYMER PARTICLES

[75] Inventors: Koji Matsumoto; Masaru Morimoto, both of Otake, Japan

[73] Assignee: Mitsubishi Rayon Company Ltd., Tokyo, Japan

[21] Appl. No.: 858,872

[22] Filed: Mar. 27, 1992

[30] Foreign Application Priority Data

Mar. 29, 1991 [JP] Japan .................. 3-066612

[51] Int. Cl.$^5$ ............. C08L 51/00; C08L 51/04; C08L 55/02
[52] U.S. Cl. .................. 524/501; 525/71; 525/80; 525/85; 525/902
[58] Field of Search ......... 525/71, 70, 85, 902, 525/83; 524/501, 500, 515, 523, 525

[56] References Cited

U.S. PATENT DOCUMENTS

| | | | |
|---|---|---|---|
| 4,097,553 | 6/1978 | Novak | 525/80 |
| 4,463,131 | 6/1984 | Grandzol et al. | 525/76 |
| 4,645,795 | 2/1987 | Hosoi et al. | 525/71 |
| 4,699,948 | 10/1987 | Kishida et al. | 525/902 |
| 5,221,713 | 6/1993 | Keinpuer et al. | 525/71 |

FOREIGN PATENT DOCUMENTS

| | | |
|---|---|---|
| 0121855 | 10/1984 | European Pat. Off. . |
| 0411822 | 2/1991 | European Pat. Off. . |
| 0418685 | 3/1991 | European Pat. Off. . |
| 46-13626 | 4/1971 | Japan . |
| 57-128736 | 2/1981 | Japan ............. 525/902 |
| 58-1742 | 1/1983 | Japan . |
| 58-48584 | 10/1983 | Japan . |
| 59-189143 | 10/1984 | Japan . |
| 61-57341 | 12/1986 | Japan . |
| 64-2644 | 1/1989 | Japan . |
| 2044779 | 10/1980 | United Kingdom . |

*Primary Examiner*—David Buttner
*Assistant Examiner*—Mark L. Warzel
*Attorney, Agent, or Firm*—Oblon, Spivak, McClelland, Maier & Neustadt

[57] ABSTRACT

Rubber-containing graft copolymer particles excellent in powder properties are prepared by a process comprising mixing, with 100 parts by weight (as solid content) of rubber-containing graft copolymer (A) in a state of slurry, 0.1 to 10 parts by weight of a rigid non-elastic multi-stage polymer (B), in a state of slurry, consisting of 30 to 80% by weight of a (co)polymer component comprising 40 to 100% by weight of methyl methacrylate and 0 to 60% by weight of one or more other monomers copolymerizable therewith being polymerized at least in the first stage and 5 to 70% by weight of a (co)polymer component comprising 70 to 100% by weight of methyl methacrylate and 0 to 30% by weight of one or more other monomers copolymerizable therewith being polymerized in the final stage, the total amount of the (co)polymer components in the respective stages being 100% by weight and the content of polymeric units derived from an acrylic ester in the multi-stage polymer (B) being from 5 to 30% by weight.

14 Claims, No Drawings

PROCESS FOR THE PREPARATION OF RUBBER-CONTAINING GRAFT COPOLYMER PARTICLES

BACKGROUND OF THE INVENTION

1. Field of the Invention

The present invention relates to a process for the preparation of rubber-containing graft copolymer particles having excellent powder properties, to thus improve the impact resistance of rigid resins such as polyvinyl chloride, polystyrene, polymethyl methacrylate and acrylonitrile-styrene copolymer, or resins known as "engineering plastics", such as polycarbonate, PET, PBT, and polyacetal.

2. Description of the Related Art

It is well known to blend a rubber-containing graft copolymer with rigid resins such as polyvinyl chloride, polystyrene, polymethyl methacrylate and acrylonitrile-styrene copolymer, or resins called "engineering plastics" such as polycarbonate, PET, PBT, and polyacetal, to thereby improve the impact resistance of these resins. The rubber-containing graft copolymer is obtained usually as powder particles, generally by coagulating a latex prepared by emulsion polymerization with an acid, a salt or the like, and then dehydrating and drying the thus-coagulated latex.

Nevertheless, these powder particles are likely to give rise to serious problems in that caused blocking occurs during the storage thereof, and a transportation line is clogged with these particles, and so on. Further, when the rubber content of the rubber-containing graft copolymer increased, to thereby improve the impact resistance of the resin to be blended with this copolymer, the above problems become more serious, and this is inconvenient.

Accordingly, with the recent automation of a measurement and an oversizing of transportation lines, an improvement of the powder properties such as blocking resistance and powder fluidity is urgently required, and thus various processes for the improvement of the powder properties of a rubber-containing graft copolymer particles have been examined. There are known, e.g., a process in which finely powdered silica, sodium carbonate, calcium carbonate, titanium dioxide, various metallic soaps or the like is added to the powder particles of a rubber-containing graft copolymer, and a process in which a lubricant is added to such powder particles, as disclosed in Japanese Unexamined Patent Publication No. 64-2644. These processes, however, are accompanied by serious problems in that the improvement of the powder properties is insufficient, or in that even if such an improvement is observed, the imparting of an impact resistance to a rubber-containing graft copolymer is lowered, and the transparency, processability and thermal stability of the powder become poor, and so on. On the other hand, Japanese Examined Patent Publication No. 58-48584 (and corresponding British Patent Publication No. 2,044,779), discloses a process in which a graft copolymer with a low rubber content, for an improvement of the powder properties, is mixed with a graft copolymer with a high rubber content, as a slurry. According to this process, the improvement of the powder properties of a graft copolymer with a high rubber content is still insufficient, although the copolymer for improving the powder properties does not adversely affect the physical properties of the graft copolymer with a high rubber content to be used. Further, the above-described Japanese Examined Patent Publication 58-48584, discloses, as Comparative Example 3, an example where an impact resisting improving agent obtained by mixing, with a rubber-containing graft copolymer, as a slurry, a rigid non-elastic double-stage polymer free from rubber component obtained by polymerizing a mixture of styrene and methyl methacrylate at the first stage and polymerizing methyl methacrylate at the second stage, is blended with a polyvinyl chloride resin. Also, an example is given wherein, in a mixture obtained by mixing the double-stage polymer with such a composition as a slurry, when the obtained modified rubber-containing graft copolymer is blended with a polyvinyl chloride resin, many fish eyes are produced, or the impact resistance of the resin is lowered, and it is stated that the effect of the rubber-containing graft copolymer of improving the properties of the resin to be blended with said copolymer is still insufficient. In addition, Japanese Examined Patent Publication No. 61-57341 (and corresponding U.S. Pat. No. 4,097,553) or Japanese Unexamined Patent Publication No. 58-1742 (and corresponding U.S. Pat. No. 4,463,131), discloses that a rigid non-elastic polymer in a state of slurry is mixed with a rubber-containing graft copolymer, but the rigid non-elastic polymers proposed in these publications are considered to be those prepared a one-stage polymerization process, from the total descriptions of these publications. As long as such a polymer is used, sometimes problems arise, similar to those described in Comparative Example 3 of the above-cited Japanese Examined Patent Publication No. 58-48584, in that, when the modified rubber-containing graft copolymer is blended with a polyvinyl chloride, fish eyes are produced and that the impact resistance of the resin is lowered.

As described above, a process has not been found whereby the powder properties can be practically sufficiently improved without producing fish eyes and without lowering the impact resistance, transparency, processability or thermal stability of the resin, when a rubber-containing graft copolymer is blended as an impact resistance improving agent with the resin to be mixed with the copolymer.

SUMMARY OF THE INVENTION

The present inventors carried out intensive studies into the obtaining of an impact resistance improving agent free from the above problems, and as a result, found that the desired object may be achieved by blending, with a rubber-containing graft copolymer, in a specific state, a rigid non-elastic multi-stage polymer consisting of a polymer component with a specific range of content containing methyl methacrylate as an indispensable ingredient, at least in the first stage, and a polymer component with a specific range of content consisting essentially of methyl methacrylate as well in the final stage, said hard non-elastic multi-stage polymer containing a polymeric unit derived from acrylic ester in said multi-stage polymer in a specific range of ratio, and thus reached the present invention.

The present invention provides a process for the preparation of rubber-containing graft copolymer particles having excellent powder properties, comprising mixing, with 100 parts by weight (as solid content) of a rubber-containing graft copolymer (A) in a state of slurry, 0.1 to 10 parts by weight of a rigid non-elastic multi-stage polymer (B), in a state of slurry, consisting of 30 to 80% by weight of a (co)polymer component comprising 40 to 100% by weight of methyl methacrylate and 0 to 60% by weight of one or more other monomers copolymerizable therewith being polymerized at least in the first stage and 5 to 70% by weight of a (co)polymer component comprising 70 to 100% by weight of methyl methacrylate and 0 to 30% by weight of one or more other monomers copolymerizable therewith being polymerized in the final stage, the total amount of the (co)polymer components in the respective stages being 100% by weight and the content of polymeric units derived from an acrylic ester in said multi-stage polymer (B) being within a range between 5 and 30% by weight.

DESCRIPTION OF THE PREFERRED EMBODIMENTS

In the present invention, a latex of the rigid non-elastic multi-stage polymer (B) is added especially in the presence of a slurry of the rubber-containing graft copolymer (A) and the mixture is coagulated, whereby the present invention is more effectively achieved. The latex of the rigid non-elastic multi-stage polymer (B) preferably has a solid content of not more than 20%.

As a rubber-containing graft copolymer useful for the present invention, there may be mentioned, e.g., one obtained by emulsion polymerizing a rubber component acting as a backbone polymer within the range of between 40 and 95% by weight, preferably 50 and 90% by weight based on the whole weight of the objective rubber-containing graft copolymer, and then graft polymerizing a monomer forming a rigid polymer within the range of between 5 and 60% by weight, preferably 10 and 50% by weight based on the whole weight of the objective rubber-containing graft copolymer in the presence of the obtained rubber latex, by a single or plurality of stages.

As a polymer forming a rubber component used as a backbone polymer, there may be mentioned, e.g., diene polymers such as butadiene, isoprene and chloroprene; acrylic ester polymers such as butyl acrylate and 2-ethylhexyl acrylate; polyorganosiloxane polymers or copolymers thereof with other monomers copolymerizable therewith, and the like. Further, there may be mentioned polymers crosslinked by the use of a crosslinking agent when producing these polymers, and those having degree of a polymerization adjusted by the use of a chain transfer agent.

As the other copolymerizable monomers, there may be mentioned aromatic vinyls such as styrene and α-methylstyrene; methacrylic esters such as methyl methacrylate, ethyl methacrylate and butyl methacrylate; acrylic esters such as methyl acrylate, ethyl acrylate, butyl acrylate and 2-ethylhexyl acrylate; vinylcyan compounds such as acrylonitrile and methacrylonitrile; and the like.

In addition, as the crosslinking agent, there may be used divinylbenzene, ethylene glycol dimethacrylate, 1, 3-butylene glycol dimethacrylate or the like, and as the chain transfer agent, there may be used t-dodecyl mercaptan, n-dodecyl mercaptan, n-octyl mercaptan and the like.

Next, as a monomer to be grafted to the rubber component, the backbone polymer, there may be mentioned aromatic vinyls such as styrene and α-methylstyrene; methacrylic esters such as methyl methacrylate, ethyl methacrylate and butyl methacrylate; acrylic esters such as methyl acrylate, ethyl acrylate, butyl acrylate and 2-ethylhexyl acrylate; vinylcyanide compounds such as acrylonitrile and methacrylonitrile; halogenated vinyls such as vinyl chloride and vinyl bromide; and the like.

Using these monomers singly or in combination of two or more thereof, a graft polymerization thereof is carried out in one or a plurality of stages.

In addition, when effecting graft polymerization, there may be used a crosslinking agent or chain transfer agent. As the crosslinking agent and chain transfer agent, there may be suitably used any of the above-described agents.

Typical examples of the rubber-containing graft copolymer in the present invention include MBS, ABS, AAS, AES, and MES resins and polyorganosiloxane rubber graft polymers, but the present invention is not limited by these resins.

Next, the rigid non-elastic multi-stage polymer to be added to a rubber-containing graft copolymer is explained. By the rigid non-elastic multi-stage polymer improving the powder properties for the rubber-containing graft copolymer used in the present invention is meant a multi-stage polymer formed merely of a rigid resin component free from an elastomeric body.

When a rigid non-elastic polymer obtained by one-stage polymerization is used, it is impossible to obtain a sufficient effect of improving the powder properties of the rubber-containing graft copolymer without deteriorating the impact resistance thereof at any composition and without producing fish eyes, when polyvinyl chloride resin is used as the resin to be mixed with said rubber-containing graft copolymer. Thus, the rigid non-elastic multi-stage polymer to be used in the present invention should be one obtained by a two- or more stage-polymerization, and notably characterized in that the compositions at the first and final stages are specified and that the content of the polymeric unit derived from acrylic ester in said polymer is specified. Any rigid non-elastic multi-stage polymer may be used, so long as it fulfills the above conditions. In the following explanations, a mixture comprising a rigid non-elastic (multi-stage) polymer blended with a rubber-containing graft copolymer is referred to as "modified rubber-containing graft polymer" for convenience.

The first stage (co)polymer component constituting the rigid non-elastic multi-stage polymer used in the present invention is formed by polymerizing 40 to 100% by weight, preferably 70 to 100% by weight of methyl methacrylate and 0 to 60% by weight, preferably 0 to 30% by weight of a monomer copolymerizable therewith. When the amount of methyl methacrylate is less than 40% by weight, the effect of improving powder properties for the rubber-containing graft copolymer becomes so small that this case is not preferred. In addition, the (co)polymer component constituting the final stage is formed by polymerizing 70 to 100% by weight, preferably 75 to 100% by weight of methyl methacrylate and 0 to 30% by weight, preferably 0 to 25% by weight of an other monomer copolymerizable therewith. When the amount of methyl methacrylate is less than 70% by weight, the effect of improving the powder properties for the rubber-containing graft copolymer is small, and the impact resistance imparting effect of the rubber-containing graft copolymer is also lowered, so that this case is not preferable.

As the other monomer copolymerizable with the first stage methyl methacrylate and the final stage methyl methacrylate forming the rigid non-elastic multi-stage polymer, there may be mentioned aromatic vinyls such as styrene and α-methylstyrene; methacrylic esters other than methyl methacrylate such as ethyl methacrylate and butyl methacrylate; acrylic esters such as methyl acrylate, ethyl acrylate, butyl acrylate and 2-ethylhexyl acrylate; vinylcyanide compounds such as acrylonitrile and methacrylonitrile. Among them, acrylic esters and aromatic vinyls are preferred, and especially ethyl acrylate, butyl acrylate and styrene are most preferable.

The amount of the first stage (co)polymer component is within the range between 30 and 80% by weight, preferably between 40 and 70% by weight, based on the total amount of the rigid non-elastic multi-stage polymer. When the amount of said (co)polymer component is less than 30% by weight, fish eyes are produced when a modified rubber-containing graft copolymer obtained by use of the above hard non-elastic multi-stage polymer is used after having been mixed with a polyvinyl chloride resin, and when said amount exceeds 80% by weight, it becomes difficult to obtain an effect of improving powder properties for the rubber-containing graft copolymer and simultaneously prevent the production of fish eyes as described above, both cases being therefore unpreferable. The amount of the final stage (co)polymer component based on the total amount of the rigid non-elastic multi-stage polymer is between 5 and 70% by weight, preferably between 10 and 60% by weight. When the amount of said (co)polymer component constituting the final stage is less than 5% by weight, the effect of improving the powder properties for the rubber-containing graft copolymer is small, and when said amount exceeds 70% by weight, many fish eyes are produced when a modified rubber-containing graft copolymer obtained by use of the rigid non-elastic multi-stage polymer is used after having been mixed with a polyvinyl chloride resin, both cases being therefore unpreferable.

Although the polymer component composition of the rigid non-elastic multi-stage polymer at a stage other than the first and final stages is not particularly limited, as the preferable monomer there may be mentioned methacrylic esters such as methyl methacrylate, ethyl methacrylate and butyl methacrylate; acrylic esters such as methyl acrylate, ethyl acrylate, butyl acrylate and 2-ethylhexyl acrylate; aromatic vinyls such as styrene and α-methylstyrene; vinylcyanide compounds such as acrylonitrile and methacrylonitrile. Especially preferred are methyl methacrylate, ethyl acrylate, butyl acrylate and styrene. Although the number of polymerization stages for producing a rigid non-elastic multi-stage polymer is not particularly limited, as long as it is 2 or more, a 2 to 4-stage polymer is preferable because productivity is lowered in the case of a 5 or more stage polymer.

The content, based on the total amount of the rigid non-elastic multi-stage polymer, of the polymeric units derived from an acrylic ester is within the range between 5 and 30% by weight, preferably 10 and 20% by weight, more preferably 12 and 18% by weight. When the amount of acrylic ester is less than 5% by weight, many fish eyes are produced when a modified rubber-containing graft copolymer obtained by use of the rigid non-elastic multi-stage polymer is used after having been mixed with a polyvinyl chloride resin, and when this amount exceeds 30% by weight, the effect of improving the powder properties for the rubber-containing graft copolymer is reduced, so that both cases are not preferable.

The rigid non-elastic multi-stage polymer can be obtained by emulsion polymerization. A known emulsifying agent may be used, and concretely, there may be used, e.g., anionic surface active agents such as fatty acid salts, alkylsulfuric ester salts, alkylbenzenesulfonates, alkylphosphoric ester salts, and dialkylsulfosuccinates; and nonionic surface active agents such as polyoxyethylene alkylethers, polyoxyethylene fatty esters, sorbitan fatty esters and glycerine fatty esters, and further, cationic surface active agents such as alkylamine salts.

When working the present invention, the amount (as solid content) of the rigid non-elastic multi-stage polymer (B) to be added to 100 parts by weight as solid content of the slurry of the rubber-containing graft copolymer (A) is between 0.1 and 10 parts by weight, preferably 0.5 and 5 parts by weight, more preferably 1 and 3 parts by weight. When the amount of said multi-stage polymer (B) added is less than 0.1 part by weight, the effect of improving the powder properties for the rubber-containing graft copolymer is reduced and becomes insufficient, and when this amount exceeds 10 parts by weight, the impact resistance imparting effect of the rubber-containing graft copolymer is lowered, this case being therefore also unpreferable. In addition, as a rigid non-elastic multi-stage polymer, there is preferred those with a reduced viscosity (determined at 25° C. with regard to a solution obtained by dissolving 0.1 g of said multi-stage polymer in 10 cc of chloroform) ranging from 1.5 to 10, and those with a reduced viscosity of between 2 and 5 are more preferably used.

Next, the process in which a rigid non-elastic multi-stage polymer is added to the rubber-containing graft copolymer is explained. To obtain a rubber-containing graft copolymer having excellent powder properties, it is indispensable to mix a slurry of said graft copolymer with that of said multi-stage polymer. As a method of mixing them, there are mentioned a method in which, with the slurry of said graft copolymer, there is mixed the slurry of a separately prepared rigid non-elastic multi-stage polymer, a method in which a latex of said multi-stage polymer is added to a slurry of said graft copolymer and the obtained mixture is coagulated in the slurry of said graft copolymer, whereby the latex is converted into a slurry, and as a result, said multi-stage polymer and said graft copolymer are mixed in a state of slurry, and so forth. When working the present invention, the latter method is more preferred. The latex of the rigid non-elastic multi-stage polymer (B) preferably has a solid content of not more than 20%, more preferably not more than 15%. Where the solid content of the latex is not more than 20%, the resulting rubber-containing graft copolymer can have an enhanced improvement in the powder properties.

In the present invention, it is very important that the rubber-containing graft copolymer is not in a state of latex but in a state of slurry. Even if a latex or slurry of the rigid non-elastic multi-stage polymer is added to a latex of the rubber-containing graft copolymer, it is difficult to obtain an effect of improving powder properties for the rubber-containing graft copolymer, and although the reason therefor is not clearly known, it is considered to be attributable to that small slurry particles of the rigid non-elastic multi-stage polymer cover the surfaces of the slurry particles of the rubber-containing graft copolymer and the particles of said multi-stage polymer conduct like rollers, whereby the stickiness among the slurry particles of said graft copolymer are reduced and its powder properties are improved. In brief, when the rubber-containing graft copolymer is a latex, even if the rigid non-elastic multi-stage polymer is added as latex or slurry, said multi-stage polymer particles are introduced in said graft copolymer particles when coagulated, and the number of said multi-stage polymer particles covering the surfaces of said graft copolymer particles becomes extremely reduced, thereby entailing an extreme reduction of the effect of improving the powder properties of said graft copolymer.

The desired object may be achieved by the use of, as an impact resistance improving agent, the modified rubber-containing graft copolymer having excellent powder properties in the present invention, after having been mixed with a non-elastic resin such as vinyl chloride resin, chlorinated vinyl chloride resin, styrenic resin, methyl methacrylate resin and acrylonitrile-styrene copolymer resin, and a resin such as polycarbonate, PET, PBT, and polyacetal, in a proportion of from 1 to 40 parts by weight based on 100 parts by weight of each of these resins.

In the following, the present invention is explained in detail with reference to working examples, but the present invention is not at all limited by these examples. "Part(s)" in the examples and comparative examples indicate "part(s) by weight" unless otherwise specified.

Evaluations of properties were conducted in the following ways.

1. Powder fluidity:
    50 g of resin powder were introduced in a bulk density measuring instrument used according to JIS-K-6721, and the fluidized state of the powder when the damper was removed was visually observed.
    ⊙ very good
    o fairly good
    Δ good
    x bad
    xx very bad 2. Blocking resistance:
    10 g of resin powder were put in a cylindrical vessel and a pressure of 0.175 kg/cm$^2$ was applied for 2 hours at a temperature of 30° C. The produced blocks were subjected to vibration by a micro-type electro-magnetic vibrating screen (manufactured by Tsutsui Rika), and the time (sec) required before 60% of the blocks were broken was determined.

3. Impact resistance:
    To 100 parts of a polyvinyl chloride resin compound containing a tinny stabilizer were added 10 parts of a rubber-containing graft copolymer or modified rubber-containing graft copolymer. This compound was contour extruded by an extruder of 25 mmφ to obtain a test piece. The Izod impact strength of this test piece was evaluated according to ASTM-D256-87.

4. Number of fish eyes:
    Using the compound described in the above paragraph 3, a film with a thickness of 0.1 mm was extruded by an extruder of 30 mmφ, and a shorter film 10 cm × 7 cm was cut out of the film. The number of fish eyes of the obtained film was determined.

EXAMPLE 1

(1) Process for the Preparation of a Butadiene Series Rubber-Containing Graft Copolymer (A-1)

| | |
|---|---|
| 1,3-butadiene (Bd) | 80 parts |
| styrene (St) | 20 parts |
| divinylbenzene | 1 part |
| ferrous sulfate | 0.006 part |
| sodium pyrophosphate | 0.6 part |
| diisopropylbenzene hydroperoxide | 0.4 part |
| dextrose | 0.4 part |
| potassium oleate | 1 part |
| deionized water | 200 parts |

Each of the charge stocks having the above-listed composition was introduced into a pressure autoclave and reacted under stirring for 48 hours at a temperature of 50° C., whereby a butadiene series rubber polymer latex was prepared (rate of polymerization: 98%). After 1 part of sodium chloride had been added to 70 parts (as solid content) of a latex of the thus obtained butadiene series rubber polymer latex, a monomer mixture consisting of 13 parts of methyl methacrylate, 2 parts of ethyl acrylate and 0.045 part of cumene hydroperoxide, and 0.06 part of formaldehydesodium sulfoxylate were added to the obtained mixture, and the first stage graft polymerization was carried out for 2 hours. Subsequently, after a monomer mixture consisting of 15 parts of styrene and 0.06 part of cumene hydroperoxide had been added to the reaction system in the presence of the polymer obtained in the previous stage as the second stage graft polymerization, the second stage graft polymerization was carried out for 3 hours at a temperature of 70° C., so that a latex (solid content: 100 parts) of a butadiene series rubber-containing graft copolymer was obtained.

(2) Process for the Preparation of a Rigid Non-Elastic Double-Stage Polymer (B-1)

In a reactor equipped with a stirrer and a reflux condenser, there was introduced a mixture consisting of 280 parts of deionized water, 1 part of sodium dioctylsulfosuccinate, 0.2 part of ammonium persulfate, 40 parts of methyl methacrylate, 5 parts of butyl acrylate and 0.02 part of n-octyl mercaptan, and the interior of the reactor was displaced by nitrogen, whereafter the reaction vessel was heated up to a temperature of 65° C. under stirring, and polymerization was carried out under heating and stirring for 2 hours. Successively, there was added into this reaction vessel a mixture consisting of 45 parts of methyl methacrylate and 10 parts of butyl acrylate over one hour, and after the completion of the addition, the polymerization was terminated by consecutive stirring for 2 hours, so that a latex of a rigid non-elastic double-stage polymer (B-1) was obtained.

(3) Mixing of the Butadiene Series Rubber-Containing Graft Copolymer (A-1) and the Rigid Non-Elastic Double-Stage Polymer (B-1)

100 parts (as solid content) of the latex of the butadiene series rubber-containing graft copolymer (A-1) prepared in (1) were added to 500 parts of 0.2 wt % sulfuric acid aqueous solution under stirring at a temperature of 40° C., and coagulated to be converted into slurry. To the thus obtained slurry, there were added 2 parts (as solid content) of the rigid non-elastic double-stage polymer (B-1) latex prepared in (2), and the obtained mixture was coagulated. The coagulated mixture was heated to a temperature of 80° C., and then dehydrated and dried, so that a modified butadiene series rubber-containing graft copolymer resin powder was obtained.

EXAMPLE 2

The slurries obtained by coagulating the butadiene series rubber-containing graft copolymer (A-1) latex prepared in Example 1-(1) and the rigid non-elastic double-stage polymer (B-1) latex prepared in Example 1-(2), separately in a 0.2 wt % aqueous solution of sulfuric acid at a temperature of 40° C., were mixed, and the obtained mixture was heated up to a temperature of 80° C. to be solidified, whereafter the solidified mixture was dehydrated and dried, so that a modified butadiene series rubber-containing graft copolymer resin powder was obtained. The mixing was effected such that the amount of the added rigid non-elastic double-stage polymer (B-1), based on 100 parts of the rubber-containing graft copolymer (A-1), was 2 parts.

COMPARATIVE EXAMPLE 1

100 parts (as solid content) of the butadiene series rubber-containing graft copolymer (A-1) latex prepared in Example 1-(1) were added under stirring to 500 parts of 0.2 wt % aqueous solution of sulfuric acid at a temperature of 40° C. and coagulated to be converted into a slurry. The obtained slurry alone was heated to a temperature of 80° C. and solidified, whereafter the solidified slurry was dehydrated and dried, so that resin powder was obtained.

COMPARATIVE EXAMPLE 2

The butadiene series rubber-containing graft copolymer (A-1) latex and the rigid non-elastic double-stage polymer (B-1) latex prepared in Example 1-(1) and (2) were blended in a state of latex, respectively, whereafter the obtained blend was coagulated with a 0.2% aqueous solution of sulfuric acid of 40° C., and solidified, dehydrated and dried, so that a resin powder was obtained. The blending was effected such that the number of parts of the rigid non-elastic double-stage polymer (B-1) added to 100 parts of the butadiene series rubber-containing graft copolymer was 2.

The results of the evaluations of the powder properties of the respective resin powders obtained in Examples 1 and 2 and Comparative Examples 1 and 2 and the properties of these resin powders as impact resistance improving agent for polyvinyl chloride are set forth in Table 1.

As is apparent from the results set forth in Table 1, in Comparative Examples 1 and 2, the powder fluidity of the resin powders is very bad, and blocking resistance thereof is also bad. On the other hand, in Examples 1 and 2, the powder fluidity is good, and it may be seen that the blocking resistance is improved to such a degree that the resin powder is little blocked. In addition, with regard to the physical properties, the impact resistance imparting effect of the rubber-containing graft copolymer and the number of fish eyes produced when the modified rubber-containing graft copolymer was used after having been mixed with polyvinyl chloride resin are both equivalent to those of Comparative Example 1, and an adverse influence due to an addition of the hard non-elastic multi-stage polymer is not recognized.

EXAMPLES 3 TO 5, AND COMPARATIVE EXAMPLES 3 AND 4

The operation of Example 1-(3) was repeated with the exception that in the mixing operation in Example 1-(3) for the butadiene series rubber-containing graft copolymer (A-1) and the hard non-elastic double-stage polymer (B-1), the amount of the added hard non-elastic double-stage polymer (B-1) was set as 0.3 part (Example 3), 5 parts (Example 4), 9 parts (Example 5), 0.05 part (Comparative Example 3) and 15 parts (Comparative Example 4), respectively, so that 5 kinds of modified butadiene series rubber-containing graft copolymers were obtained.

The evaluation results of the powder properties of each of the resin powders obtained in Examples 3 to 5 and Comparative Examples 3 and 4 and the performances thereof as an impact resistance improving agent are set forth in Table 1.

As is apparent from Table 1, as the amount of the added hard non-elastic double-stage polymer (B-1) is increased, the powder fluidity and blocking resistance of the graft copolymer powder particles are improved, but when this amount exceeds 10 parts (Comparative Example 4), the impact resistance imparting effect of the rubber-containing graft copolymer becomes lowered. On the contrary, when this amount is less than 0.1 part (Comparative Example 3), the effect of improving the powder properties for the rubber-containing graft copolymer becomes insufficient.

EXAMPLE 6

In a reactor equipped with a stirrer and a reflux condenser, there was introduced a mixture consisting of 280 parts of deionized water, 1 part of sodium dioctylsulfosuccinate, 0.2 part of ammonium persulfate, 40 parts of methyl methacrylate, 10 parts of butyl acrylate and 0.005 part of n-octyl mercaptan, and the interior of the reactor was displaced by nitrogen, whereafter the reaction vessel was heated up to a temperature of 65° C. under stirring, and polymerization was carried out under heating and stirring for 2 hours. Successively, there was added into this reaction vessel a mixture consisting of 45 parts of methyl methacrylate, 5 parts of butyl acrylate and 0.005 part of n-octyl mercaptan over one hour, and after the completion of the addition, the polymerization was terminated after consecutive stirring for 2 hours, so that a latex of a rigid non-elastic double-stage polymer (B-2) was obtained.

100 parts (as solid content) of the butadiene series rubber-containing graft copolymer (A-1) prepared in Example 1-(1) and 2 parts (as solid content) of the rigid non-elastic double-stage polymer (B-2) obtained in the way as described above were mixed by the same mixing operation as shown in Example 1-(3), whereafter the obtained mixture was dehydrated and dried, so that a modified butadiene series rubber-containing graft copolymer resin powder was obtained.

EXAMPLE 7

In a reactor equipped with a stirrer and a reflux condenser, there was introduced a mixture consisting of 280 parts of deionized water, 1 part of sodium dioctylsulfosuccinate, 0.2 part of ammonium persulfate, 55 parts of methyl methacrylate, 10 parts of butyl acrylate and 0.005 part of n-octyl mercaptan, and the interior of the reactor was displaced by nitrogen, whereafter the reaction vessel was heated to a temperature of 65° C. under stirring, and stirring was continued under heating for 2 hours, whereupon polymerization was carried out. Successively, there was added to this reaction vessel a mixture consisting of 20 parts of methyl methacrylate, 5 parts of butyl acrylate and 0.003 part of n-octyl mercaptan over one hour, and after the completion of the addition, stirring was continued for 2 hours, following which there was added a mixture consisting of 10 parts of methyl methacrylate and 0.002 part of n-octyl mercaptan and stirring was continued for one hour to terminate the polymerization, so that a rigid non-elastic three-stage polymer (B-3) latex was obtained. 100 parts (as solid content) of the butadiene series rubber-containing graft copolymer (A-1) latex prepared in Example 1-(1) and 2 parts (as solid content) of the rigid non-elastic three-stage polymer (B-3) latex obtained as described above were mixed by the same mixing operation as described in Example 1-(3), whereafter the obtained mixture was dehydrated and dried, so that a modified butadiene series rubber-containing graft copolymer resin powder was obtained.

COMPARATIVE EXAMPLE 5

In a reactor equipped with a stirrer and a reflux condenser, there was introduced a mixture consisting of 280 parts of deionized water, 1 part of sodium dioctylsulfosuccinate, 0.2 part of ammonium persulfate, 85 parts of methyl methacrylate, 15 parts of butyl acrylate and 0.01 part of n-octyl mercaptan, and the interior of the reactor was displaced by nitrogen, whereafter the reaction vessel was heated to a temperature of 65° C. under stirring, and stirring was continued under heating for 2 hours to complete polymerization, so that a rigid non-elastic one-stage polymer (B-4) latex was obtained.

100 parts (as solid content) of the butadiene series rubber-containing graft copolymer (A-1) latex prepared in Example 1-(1) and 2 parts (as solid content) of the rigid non-elastic one-stage polymer (B-4) latex obtained as described above were mixed by the same mixing operation as described in Example 1-(3), whereafter the obtained mixture was dehydrated and dried, so that a modified butadiene series rubber-containing graft copolymer resin powder was obtained.

COMPARATIVE EXAMPLE 6

In a reactor equipped with a stirrer and a reflux condenser, there was introduced a mixture consisting of 280 parts of deionized water, 1 part of sodium dioctylsulfosuccinate, 0.2 part of ammonium persulfate, 70 parts of methyl methacrylate, 1 part of butyl acrylate and 0.01 part of n-octyl mercaptan, and the interior of the reactor was displaced by nitrogen, whereafter the reaction vessel was heated to a temperature of 65° C. under stirring, and stirring was continued under heating for 2 hours to carry out polymerization. Successively, there was added to this reaction vessel a mixture consisting of 10 parts of methyl methacrylate and 0.01 part of n-octyl mercaptan over one hour, and after the completion of the addition, stirring was continued for 2 hours, following which there was added a mixture consisting of 17 parts of methyl methacrylate, 2 parts of butyl acrylate and 0.01 part of n-octyl mercaptan over one hour, and consecutive stirring for 2 hours was conducted to complete the polymerization, so that a rigid non-elastic three-stage polymer (B-5) latex was obtained.

100 parts (as solid content) of the butadiene series rubber-containing graft copolymer (A-1) latex prepared in Example 1-(1) and 2 parts (as solid content) of the rigid non-elastic three-stage polymer (B-5) latex obtained as described above were mixed by the same mixing operation as described in Example 1-(3), whereafter the obtained mixture was dehydrated and dried, so that a modified butadiene series rubber-containing graft copolymer resin powder was obtained.

COMPARATIVE EXAMPLE 7

In a reactor equipped with a stirrer and a reflux condenser, there was introduced a mixture consisting of 280 parts of deionized water, 1 part of sodium dioctylsulfosuccinate, 0.2 part of ammonium persulfate, 50 parts of methyl methacrylate and 30 parts of styrene, and the interior of the reactor was displaced by nitrogen, whereafter the reaction vessel was heated to a temperature of 65° C. under stirring, and stirring was continued under heating for 2 hours to carry out polymerization. Successively, there was added to this reaction vessel a mixture consisting of 17 parts of methyl methacrylate, 3 parts of butyl acrylate and 0.05 part of n-octyl mercaptan over one hour, and after the completion of the addition, consecutive stirring for 2 hours was conducted to complete the polymerization, so that a rigid non-elastic double-stage polymer (B-6) latex was obtained.

100 parts (as solid content) of the butadiene series rubber-containing graft copolymer (A-1) latex prepared in Example 1-(1) and 2 parts (as solid content) of the rigid non-elastic double-stage polymer (B-6) latex obtained as described above were mixed by the same mixing operation as described in Example 1-(3), whereafter the obtained mixture was dehydrated and dried, so that a modified butadiene series rubber-containing graft copolymer resin powder was obtained.

COMPARATIVE EXAMPLE 8

In a reactor equipped with a stirrer and reflux condenser, there was introduced a mixture consisting of 280 parts of deionized water, 1 part of sodium dioctylsulfosuccinate, 0.2 part of ammonium persulfate, 38 parts of methyl methacrylate and 22 parts of butyl acrylate, and the interior of the reactor was displaced by nitrogen, whereafter the reaction vessel was heated to a temperature of 65° C. under stirring, and stirring was continued under heating to carry out polymerization. Successively, there was added to this reaction vessel a mixture consisting of 30 parts of methyl methacrylate, 10 parts of ethyl acrylate and 0.05 part of n-octyl mercaptan over one hour, and after the completion of the addition, consecutive stirring for 2 hours was conducted to complete the polymerization, so that a rigid non-elastic double-stage polymer (B-7) was obtained.

100 parts (as solid content) of the butadiene series rubber-containing graft copolymer (A-1) latex prepared in Example 1-(1) and 2 parts (as solid content) of the rigid non-elastic double-state polymer (B-7) latex obtained as described above were mixed by the same mixing operation as described in Example 1-(3), whereafter the obtained mixture was dehydrated and dried, so that a modified butadiene series rubber-containing graft copolymer resin powder was obtained.

The powder properties of each of the resin powders obtained in Examples 6 and 7 and Comparative Examples 5 to 8 as well as the performances thereof as an impact resistance improving agent for polyvinyl chloride resin are set forth in Table 1.

In the case where the hard non-elastic polymer is a multi-stage polymer as shown in Examples 6 and 7, when the modified rubber-containing graft copolymer is used after having been mixed with a polyvinyl chloride, few fish eyes were produced; on the contrary, where the rigid non-elastic polymer is a one-stage polymer (Comparative Example 5) having the same composition with as a rigid non-elastic multi-stage polymer, very many fish eyes were produced compared with said multi-stage polymer. Even in the case of multi-stage polymer, if the content of acrylic ester in such a rigid non-elastic multi-stage polymer is less than 5% by weight (Comparative Examples 6 and 7), when the modified rubber-containing graft copolymer is used after having been mixed with polyvinyl chloride resin, very many fish eyes are produced and the impact resistance imparting effect of the rubber-containing graft copolymer is also lowered. In addition, when the amount of acrylic ester exceeds 30% by weight (Comparative Example 8), the effect of improving powder properties and blocking resistance becomes very much deteriorated.

EXAMPLE 8

In a reactor equipped with a stirrer and a reflux condenser, there was introduced a mixture consisting of 280 parts of deionized water, 1 part of sodium dioctylsulfosuccinate, 0.2 part of ammonium persulfate, 69 parts of methyl methacrylate and 0.03 part of n-octyl mercaptan, and the interior of the reactor was displaced by nitrogen, whereafter the reaction vessel was heated to a temperature of 65° C. under stirring, and the reactants were stirred under heating for 2 hours, whereupon polymerization was carried out. Successively, there was added to this reaction vessel a mixture consisting of 25 parts of methyl methacrylate, 6 parts of 2-ethylhexyl acrylate and 0.01 part of n-octyl mercaptan over one hour, and after the completion of the addition, consecutive stirring for 2 hours was conducted to complete the polymerization, so that a rigid non-elastic double-stage polymer (B-8) latex was obtained.

100 parts (as solid content) of the butadiene series rubber-containing graft copolymer (A-1) latex prepared in Example 1-(1) and 2 parts (as solid content) of the rigid non-elastic double-stage polymer (B-8) latex obtained as described above were mixed by the same mixing operation as described in Example 1-(3), whereafter the obtained mixture was dehydrated and dried, so that a modified butadiene series rubber-containing graft copolymer resin powder was obtained.

EXAMPLE 9

In a reactor equipped with a stirrer and a reflux condenser, there was introduced a mixture consisting of 280 parts of deionized water, 1 part of sodium dioctylsulfosuccinate, 0.2 part of ammonium persulfate, 42 parts of methyl methacrylate and 6 parts of butyl acrylate, and the interior of the reactor was displaced by nitrogen, whereafter the reaction vessel was heated to a temperature of 65° C. under stirring, and the mixture was stirred under heating for 2 hours, whereupon polymerization was carried out. Successively, there was added to this reaction vessel a mixture consisting of 39 parts of methyl methacrylate, 3 parts of acrylonitrile and 0.005 part of n-octyl mercaptan over one hour, and after the completion of the addition, consecutive stirring for 2 hours was conducted, following which there was added a mixture consisting of 10 parts of methyl methacrylate and 0.01 part of n-octyl mercaptan over one hour, and stirring was continued for one hour to complete the polymerization, so that a rigid non-elastic three-stage polymer (B-9) latex was obtained.

100 parts (as solid content) of the butadiene series rubber-containing graft copolymer (A-1) latex prepared in Example 1-(1) and 2 parts (as solid content) of the rigid non-elastic three-stage polymer (B-9) latex obtained as described above were mixed by the same mixing operation as described in Example 1-(3), whereafter the obtained mixture was dehydrated and dried, so that a modified butadiene series rubber-containing graft copolymer resin powder was obtained.

EXAMPLE 10

In a reactor equipped with a stirrer and a reflux condenser, there was introduced a mixture consisting of 280 parts of deionized water, 1 part of sodium dioctylsulfosuccinate, 0.2 part of ammonium persulfate, 40 parts of methyl methacrylate and 15 parts of butyl acrylate, and the interior of the reactor was displaced by nitrogen, whereafter the reaction vessel was heated to a temperature of 65° C. under stirring, and the mixture was stirred under heating for 2 hours, whereupon polymerization was carried out. Successively, there was added to this reaction vessel a mixture consisting of 20 parts of styrene and 0.005 part of n-octyl mercaptan over one hour, and stirring was continued for 2 hours, and then there was added a mixture consisting of 20 parts of methyl methacrylate, 5 parts of butyl acrylate and 0.01 part of n-octyl mercaptan over one hour, and stirring was continued for a further one hour to complete the polymerization, so that a rigid non-elastic three-stage polymer (B-10) latex was obtained.

100 parts (as solid content) of the butadiene series rubber-containing graft copolymer (A-1) latex prepared in Example 1-(1) and 2 parts (as solid content) of the rigid non-elastic three-stage polymer (B-10) latex obtained as described above were mixed by the same mixing operation as described in Example 1-(3), whereafter the obtained mixture was dehydrated and dried, so that a modified butadiene series rubber-containing graft copolymer resin powder was obtained.

COMPARATIVE EXAMPLE 9

In a reactor equipped with a stirrer and a reflux condenser, there was introduced a mixture consisting of 280 parts of deionized water, 1 part of sodium dioctylsulfosuccinate, 0.2 part of ammonium persulfate, 10 parts of methyl methacrylate and 20 parts of ethyl acrylate, and the interior of the reactor was displaced by nitrogen, whereafter the reaction vessel was heated to a temperature of 65° C. under stirring, and the mixture was stirred under heating for 2 hours, whereupon polymerization was carried out. Successively, there was added to this reaction vessel a mixture consisting of 68 parts of methyl methacrylate, 2 parts of ethyl acrylate and 0.05 part of n-octyl mercaptan over one hour, and after completion of the addition, stirring was continued for 2 hours to complete the polymerization, so that a rigid non-elastic double-stage polymer (B-11) latex was obtained.

100 parts (as solid content) of the butadiene series rubber-containing graft copolymer (A-1) latex prepared in Example 1-(1) and 2 parts (as solid content) of the rigid non-elastic double-stage polymer (B-11) latex obtained as described above were mixed by the same mixing operation as described in Example 1-(3), whereafter the obtained mixture was dehydrated and dried, so that modified butadiene series rubber-containing graft copolymer resin powder was obtained.

COMPARATIVE EXAMPLE 10

In a reactor equipped with a stirrer and a reflux condenser, there was introduced a mixture consisting of 280 parts of deionized water, 1 part of sodium dioctylsulfosuccinate, 0.2 parts of ammonium persulfate, 70 parts of methyl methacrylate and 5 parts of butyl acrylate, and the interior of the reactor was displaced by nitrogen, whereafter the reaction vessel was heated to a temperature of 65° C. under stirring, and the mixture was stirred under heating for 2 hours, whereupon polymerization was carried out. Successively, there was added to this reaction vessel a mixture consisting of 15 parts of methyl methacrylate, 10 parts of butyl acrylate and 0.05 part of n-octyl mercaptan over one hour, and after completion of the addition, stirring was continued for 2 hours to complete the polymerization, so that a rigid non-elastic double-stage polymer (B-12) latex was obtained.

100 parts (as solid content) of the butadiene series rubber-containing graft copolymer (A-1) latex prepared in Example 1-(1) and 2 parts (as solid content) of the rigid non-elastic double-stage polymer (B-12) latex obtained as described above were mixed by the same mixing operation as described in Example 1-(3), whereafter the obtained mixture was dehydrated and dried, so that a modified butadiene series rubber-containing graft polymer resin powder was obtained.

EXAMPLE 11

The procedure for the preparation of the rigid non-elastic multi-stage polymer as described in Example 1-(2) was repeated, except that the solid content was 12%, to obtain a rigid non-elastic double-stage polymer (B-13) latex.

100 parts (as solid content) of the butadien series rubber-containing graft copolymer (A-1) latex prepared in Example 1-(1) and 2 parts (as solid) of the rigid non-elastic double-stage polymer (B-13) obtained as described above were mixed by the same mixing operation as described in Example 1-(3). Then, the obtained mixture was dehydrated and dried, so that a modified butadiene series rubber-containing graft polymer resin powder was obtained.

EXAMPLE 12

The procedure for the preparation of the rigid non-elastic multi-stage polymer as described in Example 10 was repeated, except that the solid content was 8%, to obtain a rigid non-elastic three-stage polymer (B-14) latex.

100 parts (as solid content) of the butadien series rubber-containing graft copolymer (A-1) latex prepared in Example 1-(1) and 2 parts (as solid) of the rigid non-elastic three-stage polymer (B-14) obtained as described above were mixed by the same mixing operation as described in Example 1-(3). Then, the obtained mixture was dehydrated and dried, so that a modified butadiene series rubber-containing graft polymer resin powder was obtained.

The evaluation results of the powder properties of each of the resin powders obtained in Examples 8 to 12 and Comparative Examples 9 and 10 and the performances thereof as an impact resistance improving agent for a polyvinyl chloride resin are set forth in Table 1.

Table 1 shows that in Examples 8 to 10, the rubber-containing graft copolymers have an excellent impact resistance imparting effect, and when a modified rubber-containing graft copolymer is used after having been mixed with a polyvinyl chloride resin, there few fish eyes are produced, and the powder fluidity and blocking resistance thereof are improved, which shows that the object of the present invention is achieved. On the contrary, when the amount of methyl methacrylate at the first stage of a rigid non-elastic multi-stage polymer is less than 40% based on the whole monomers at the first stage (Example 9), and when the methyl methacrylate at the final stage is less than 70% by weight based on the whole monomers at the final stage (Comparative Example 10), little improvement of the powder properties for the rubber-containing graft copolymer is obtained, and the impact resistance imparting effect of the rubber-containing graft copolymer is also reduced.

TABLE 1

| | Name | Composition of rigid non-elastic multi-stage polymer (B) (parts) | | | Amount of Added (B) (parts) | Powder fluidity | Blocking resistance (sec) | Impact resistance (kg · cm/cm$^2$) | Number of fish eyes |
| | | 1st stage | 2nd stage | 3rd stage | | | | | |
|---|---|---|---|---|---|---|---|---|---|
| Example 1 | B-1 | M/B 40 5 | M/B 45 10 | — | 2 | ⊙ | 8 | 78 | 11 |
| Example 2 | B-1 | M/B 40 5 | M/B 45 10 | — | 2 | ⊙ | 10 | 75 | 13 |
| Comparative Example 1 | — | — | — | — | — | XX | 150 | 79 | 12 |
| Comparative Example 2 | B-1 | M/B 40 5 | M/B 45 10 | — | 2 | XX | 130 | 75 | 14 |
| Example 3 | B-1 | M/B 40 5 | M/B 45 10 | — | 0.3 | ○ | 49 | 78 | 11 |
| Example 4 | B-1 | M/B 40 5 | M/B 45 10 | — | 5 | ⊙ | not blocked | 70 | 16 |
| Example 5 | B-1 | M/B 40 5 | M/B 45 10 | — | 9 | ⊙ | not blocked | 62 | 23 |
| Comparative Example 3 | B-1 | M/B 40 5 | M/B 45 10 | — | 0.05 | X | 145 | 78 | 10 |
| Comparative Example 4 | B-1 | M/B 40 5 | M/B 45 10 | — | 15 | ⊙ | not blocked | 12 | 29 |
| Example 6 | B-2 | M/B 40 10 | M/B 45 10 | — | 2 | ⊙ | 5 | 76 | 14 |
| Example 7 | B-3 | M/B 55 10 | M/B 20 5 | M 10 | 2 | ⊙ | 3 | 69 | 18 |
| Comparative | B-4 | M/B | — | — | 2 | ⊙ | 17 | 63 | 91 |

TABLE 1-continued

| | | Composition of rigid non-elastic multi-stage polymer (B) (parts) | | | Amount of Added (B) (parts) | Powder fluidity | Blocking resistance (sec) | Impact resistance (kg · cm/cm²) | Number of fish eyes |
|---|---|---|---|---|---|---|---|---|---|
| | Name | 1st stage | 2nd stage | 3rd stage | | | | | |
| Example 5 | | 85 15 | | | | | | | |
| Comparative Example 6 | B-5 | M/B 70 1 | M 10 | M/B 17 2 | 2 | ⊙ | not blocked | 22 | 126 |
| Comparative Example 7 | B-6 | M/S 50 30 | M/B 17 3 | — | 2 | ⊙ | not blocked | 15 | 183 |
| Comparative Example 8 | B-7 | M/B 38 22 | M/E 30 10 | — | 2 | X | 112 | 70 | 12 |
| Example 8 | B-8 | M 69 | M/2-EHA 25 6 | — | 2 | ⊙ | not blocked | 61 | 33 |
| Example 9 | B-9 | M/B 42 6 | M/AN 39 3 | M 10 | 2 | ⊙ | not blocked | 57 | 39 |
| Example 10 | B-10 | M/B 40 15 | S 20 | M/B 20 5 | 2 | Δ | 32 | 71 | 13 |
| Comparative Example 9 | B-11 | M/E 10 20 | M/E 68 2 | — | 2 | X | 70 | 28 | 11 |
| Comparative Example 10 | B-12 | M/B 70 5 | M/B 15 10 | — | 2 | X | 89 | 32 | 14 |
| Example 11 | B-13 | M/B 40 5 | M/B 45 10 | — | 2 | ⊙ | not blocked | 79 | 10 |
| Example 12 | B-14 | M/B 40 15 | S 20 | M/B 20 5 | 2 | ⊙ | 8 | 70 | 12 |

M: methyl methacrylate
B: butyl acrylate
E: ethyl acrylate
S: styrene
2-EHA: 2-ethylhexyl acrylate
AN: acrylonitrile According to the process of the present invention, there are obtained excellent effects such that the powder properties such as powder fluidity and blocking resistance can be improved without lowering the impact resistance imparting effect and fish eye preventing effect of the graft copolymer, and a resin powder can be automatically measured and an oversizing of transportation lines permitted, and so forth.

We claim:

1. A process for preparing rubber-containing graft copolymer particles having excellent powder properties, comprising mixing, with 100 parts by weight, as solid content, of a rubber-containing graft polymer (A) in a slurry state, 0.1 to 10 parts by weight of a rigid non-elastic multi-stage polymer (B), in a state of slurry consisting of 30 to 80% by weight of a copolymer component comprising 40 to 100% by weight of methyl methacrylate and 0 to 60% by weight of one or more other monomers copolymerizable therewith being polymerized at least in the first stage and 5 to 70% by weight of a copolymer component comprising 70 to 100% by weight of methyl methacrylate and 0 to 30% by weight of one or more other monomers copolymerizable therewith being polymerized in the final state, the total amount of the copolymer components in the respective stages being 100% by weight and the content of polymeric units derived from an acrylic ester in said multi-stage polymer (B) being from 5 to 30% by weight, and wherein said rubber-containing graft polymer (A) is a graft copolymer obtained by emulsion polymerizing a rubber component acting as a backbone polymer within the range of between about 40 and 95% by weight, and then graft copolymerizing a monomer forming a rigid polymer within the range of between about 5 and 60% by weight, based on the total weight of the rubber-containing graft copolymer.

2. The process according to claims 1, wherein said rubber component acting as a backbone polymer in said graft copolymer is selected from the group consisting of polymers of dienes, acrylic esters and organosiloxanes.

3. The process according to claim 1, wherein said monomer which is graft copolymerized to said emulsion-polymerized rubber component is selected from the group consisting of aromatic vinyl monomers, methacrylic ester monomers, acrylic ester monomers, vinyl cyanide monomers and halogenated vinyl monomers.

4. The process according to claim 1, wherein a latex of the rigid non-elastic multi-stage polymer (B) is added to a slurry of the rubber-containing graft copolymer (A) and the mixture is coagulated, thereby mixing the polymer (A) and polymer (B) in a slurry state.

5. The process according to claim 1, where the latex of the rigid non-elastic multi-stage polymer (B) has a solid content of not more than 20%.

6. The process according to claim 1, wherein the rubber-containing graft copolymer (A) is selected from MBS, ABS, AAS, AES and MES resins and polyorganosiloxane rubber graft copolymers.

7. The process according to claim 1, wherein the first stage polymer component is a polymer obtained by polymerizing 70 to 100% by weight of methyl methacrylate and 0 to 30% by weight of one or more other monomers copolymerizable therewith.

8. The process according to claim 1, wherein the final stage polymer component is a polymer obtained by polymerizing 75 to 100% by weight of methyl methacrylate and 0 to 25% by weight of one or more other monomers copolymerizable therewith.

9. The process according to claim 1, wherein the monomers copolymerizable with methyl methacrylate used in the first and final stages are selected from styrene, α-methylstyreneethyl methacrylate, butyl methacrylate, methyl acrylate, ethyl acrylate, butyl acrylate, 2-ethylhexyl acrylate, acrylonitrile and methacrylonitrile.

10. The process according to claim 1, wherein the amount of the first stage polymer component is 40 to 70% based on the total weight of the rigid non-elastic multi-stage polymer (B).

11. The process according to claim 1, wherein the amount of the final stage polymer component is 10 to 60% based on the total weight of the rigid non-elastic multi-stage polymer (B).

12. The process according to claim 1, wherein the rigid non-elastic multi-stage polymer (B) is a 2 to 4-stage polymer.

13. The process according to claim 1, wherein the content of polymeric units derived from an acrylic ester is within a range of from 10 to 20% by weight.

14. The process according to claim 1, wherein the rigid non-elastic multi-stage polymer (B) is added to the rubber-containing graft copolymer (A) in an amount of 0.5 to 5 parts by weight per 100 parts by weight of the rubber-containing graft copolymer (A).

* * * * *